US007008692B2

(12) United States Patent
Usuki et al.

(10) Patent No.: US 7,008,692 B2
(45) Date of Patent: Mar. 7, 2006

(54) PROTECTIVE LAYER TRANSFER SHEET

(75) Inventors: Hideki Usuki, Shinjuku-Ku (JP); Satoshi Moriguchi, Shinjuku-Ku (JP); Hitoshi Saito, Shinjuku-Ku (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 50 days.

(21) Appl. No.: 11/055,080

(22) Filed: Feb. 11, 2005

(65) Prior Publication Data

US 2005/0142340 A1 Jun. 30, 2005

Related U.S. Application Data

(63) Continuation of application No. 09/684,927, filed on Oct. 10, 2000, now abandoned.

(30) Foreign Application Priority Data

Oct. 14, 1999 (JP) ................................ 11-292919

(51) Int. Cl.
*B32B 5/16* (2006.01)

(52) U.S. Cl. ................ 428/331; 428/32.79; 428/195.1; 428/347; 428/349

(58) Field of Classification Search ............. 428/32.79, 428/195.1, 331, 347, 349
See application file for complete search history.

(56) References Cited

U.S. PATENT DOCUMENTS 5,134,112 A 7/1992 Kanto et al.
5,427,997 A 6/1995 Oshima et al.
5,940,111 A 8/1999 Akada et al.
5,965,485 A 10/1999 Mizumachi et al.

FOREIGN PATENT DOCUMENTS

EP 0 487 727 A1 6/1992
EP 0 930 173 A1 7/1999
EP 0 943 453 A1 9/1999

*Primary Examiner*—Bruce H. Hess
(74) *Attorney, Agent, or Firm*—Parkhurst & Wendel, L.L.P.

(57) ABSTRACT

A protective layer transfer sheet comprising a thermally transferable protective layer releasably provided on a substrate sheet is provided which, when a protective layer is formed by thermal transfer onto an image-receiving sheet with an image formed thereon, can prevent carrying troubles, such as meandering or cockling, within a printer. In a protective layer transfer sheet 10 comprising a substrate sheet 1, a heat-resistant slip layer 3 provided on one side of the substrate sheet 1, and a thermally transferable protective layer 2 releasably provided on at least a part of the surface of the substrate sheet 1 remote from the heat-resistant slip layer 3, bringing the coefficient of friction between the surface of the protective layer and the surface of the image-receiving sheet before thermal transfer to 0.05 to 0.5 in terms of $\mu_0$ (coefficient of static friction) and $\mu$ (coefficient of dynamic friction) with the value of $\mu_0/\mu$ being 1.0 to 1.5, that is, bringing the coefficient of static friction and the coefficient of dynamic friction to the above respective ranges and reducing the difference between the coefficient of static friction and the coefficient of dynamic friction to the above range, can prevent carrying troubles, such as meandering or cockling, within a printer.

7 Claims, 1 Drawing Sheet

PROTECTIVE LAYER TRANSFER SHEET

TECHNICAL FIELD

The present invention relates to a protective layer transfer sheet which can form a protective layer by thermal transfer on an object, such as an image-receiving sheet with an image formed thereon. More particularly, the present invention relates to a protective layer transfer sheet which can prevent carrying troubles, such as meandering or cockling, within a printer.

BACKGROUND OF THE INVENTION

At the present time, thermal transfer recording is widely used as a simple printing method. The thermal transfer recording can simply form various images, and thus is utilized in printing wherein the number of prints may be relatively small, for example, the preparation of ID cards, such as identification cards, photographs for business, or printers of personal computers or video printers. When a full-color halftone image, such as a photograph-like image of a face, is preferred, the thermal transfer sheet used is such that, for example, various colorant layers of yellow, magenta, and cyan (and, in addition, optionally black) are provided as ink layers in a large number in a face serial manner on a continuous substrate film. Such thermal transfer sheets are classified roughly into thermal transfer sheets of the so-called "melt transfer (ink transfer)" type wherein the colorant layer is melted and softened upon heating and as such is transferred onto an object, that is, an image-receiving sheet, and thermal transfer sheets of the so-called "sublimation (dye transfer)" type wherein, upon heating, a dye contained in the colorant layer is sublimated to permit the dye to migrate onto the image-receiving sheet.

When the above thermal transfer sheet is used, for example, to prepare ID cards, such as identification cards, the melt transfer type is advantageous in that line images, such as letters or numeric characters, can be easily formed, but on the other hand, the fastness property, particularly abrasion resistance, is disadvantageously poor. On the other hand, the sublimation type is suitable for the formation of halftone images, such as photograph-like images of a face. Unlike conventional printing inks, however, no vehicle is used. Therefore, the formed images are poor in fastness properties such as abrasion resistance, and, in addition, when brought into contact, for example, with plasticizer-containing card cases, file sheets, erasers made of plastics or the like, disadvantageously cause migration of dyes onto them. Further, the formed images have poor chemical resistance, solvent resistance and other properties and hence cause blurring or other unfavorable phenomena. For this reason, an attempt to further transfer a protective layer on the formed image from a protective layer transfer sheet has been made to further impart improved fastness properties, such as abrasion resistance, chemical resistance, and solvent resistance, to the formed images. For example, a protective layer transfer sheet comprising a substrate film, a transparent resin layer releasably provided on the substrate film, and a heat-sensitive adhesive layer provided on the transparent resin layer is used to transfer and stack a transparent resin layer on an object with an image formed thereon through the heat-sensitive adhesive layer.

Since, however, the heat-sensitive adhesive layer in the conventional protective layer transfer sheet consists of a resin alone, the coefficient of friction between the heat-sensitive adhesive layer and an object such as an image-receiving sheet is very high. For this reason, in printer mechanisms having a compact design in recent years, when the protective layer transfer sheet and the image-receiving sheet are carried, the protective layer transfer sheet remains contacted with the image-receiving sheet and is less likely to be separated from the image-receiving sheet. This causes jamming, or cockling or other phenomena at the time of printing due to poor slip properties.

This phenomenon will be described in conjunction with a printer conceptually shown in FIG. 4. The printer has a mechanism such that rollers 9 provided just before a platen roller 7 and a thermal head 8 for the reasons of a restriction on space sandwiches and holds therebetween an assembly of a protective layer transfer sheet 10 and an image-receiving sheet 11, with an image formed thereon, stacked on top of each other, and carries and feeds the assembly into between the platen roller 7 and the thermal head 8. Upon the completion of transfer of a protective layer from the protective layer transfer sheet 10, the protective layer transfer sheet 10 and the image-receiving sheet 11 are carried to respective stand-by positions for next transfer. In this case, the rollers 9 come apart from each other and is brought to a released state. This permits the protective layer transfer sheet 10 and the image-receiving sheet 11 to come apart from each other and to be carried to respective stand-by positions. In this operation, the extent of carrying of the protective layer transfer sheet 10 is different from the extent of carrying of the image-receiving sheet 11, and when they are carried in such a state that the separation of the protective layer transfer sheet 10 from the image-receiving sheet 11 is unsatisfactory, the protective layer transfer sheet 10, which is generally inferior in nerve to the image-receiving sheet 11, is unfavorably carried with the protective layer transfer sheet 10 attached to the image-receiving sheet 11.

In large printers, meandering or cockling occurs due to poor slip properties between the protective layer transfer sheet and the image-receiving sheet. In particular, when the film is slantingly fed due to poor accuracy of mounting of the cassette and the film, the occurrence of meandering or cockling is significant.

DISCLOSURE OF THE INVENTION

Accordingly, it is an object of the present invention to provide a protective layer transfer sheet comprising a thermally transferable protective layer releasably provided on a substrate sheet, which protective layer transfer sheet, when a protective layer is formed by thermal transfer onto an image-receiving sheet with an image formed thereon, can prevent carrying troubles, such as meandering or cockling, within a printer.

In order to attain the above object, according to one aspect of the present invention, there is provided a protective layer transfer sheet comprising: a substrate sheet; a heat-resistant slip layer provided on one side of the substrate sheet; and a thermally transferable protective layer releasably provided on at least a part of the surface of the substrate sheet remote from the heat-resistant slip layer, the coefficient of friction between the surface of the protective layer and the surface of the image-receiving sheet before thermal transfer being 0.05 to 0.5 in terms of $\mu_0$ (coefficient of static friction) and $\mu$ (coefficient of dynamic friction) with the value of $\mu_0/\mu$ being 1.0 to 1.5. Thus, bringing the coefficient of static friction and the coefficient of dynamic friction to the above respective ranges and reducing the difference between the coefficient of static friction and the coefficient of dynamic friction to the above range, can prevent carrying troubles, such as meandering or cockling, within a printer.

The thermally transferable protective layer preferably contains microsilica.

Further, preferably, the thermally transferable protective layer comprises a main protective layer and an adhesive layer provided in that order from the substrate sheet side, and the adhesive layer contains microsilica.

The content of the microsilica is preferably 0.1 to 10%, more preferably 3 to 5%, based on the resin solid matter in the layer containing the microsilica.

The particle diameter of the microsilica is preferably 1 to 10 μm in terms of the average diameter of secondary particles as measured by a Coulter counter method.

Preferably, the thermally transferable protective layer contains at least one resin selected from the group consisting of polyester resins, polycarbonate resins, acrylic resins, ultraviolet absorbing resins, and epoxy resins, and microsilica.

Preferably, the thermally transferable protective layer comprises a release layer, a main protective layer, and an adhesive layer provided in that order from the substrate sheet side, the release layer contains an acrylic resin, and the adhesive layer contains at least one resin selected from the group consisting of polyester resins, polycarbonate resins, butyral resins, acrylic resins, ultraviolet absorbing resins, and epoxy resins, and microsilica.

Preferably, the release layer is non-transferable, and, upon thermal transfer, the release layer stays on the substrate sheet while the protective layer is separable from the substrate sheet.

Preferably, upon thermal transfer, the thermally transferable protective layer is separable directly from the substrate sheet.

BEST MODE FOR CARRYING OUT THE INVENTION

Next, the present invention will be described in more detail with reference to the following embodiments.

Figure 1:
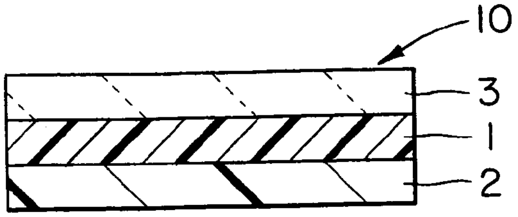
FIG. 1 is a cross-sectional view showing an embodiment of the protective layer transfer sheet according to the present invention.

FIG. 1 is a cross-sectional view showing an embodiment of a protective layer transfer sheet 10 according to the present invention. In the protective layer transfer sheet 10, a heat-resistant slip layer 3 is provided on one side of a substrate sheet 1, and a thermally transferable protective layer 2 is provided on the other side of the substrate sheet 1. The thermally transferable protective layer 2 can be thermally separated from the substrate sheet 1.

Figure 2:
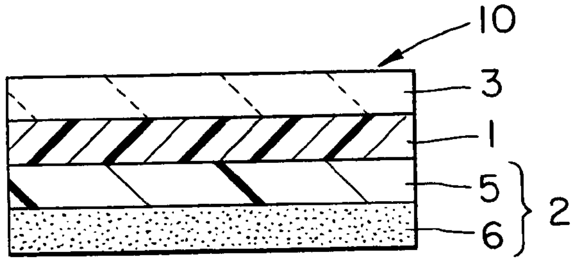
FIG. 2 is a cross-sectional view showing another embodiment of the protective layer transfer sheet according to the present invention.

FIG. 2 is a cross-sectional view showing another embodiment of the protective layer transfer sheet 10 according to the present invention. In the protective layer transfer sheet 10, a heat-resistant slip layer 3 is provided on one side of the substrate sheet 1, and a main protective layer 5 and an adhesive layer 6 are provided in that order on the other side of the substrate sheet 1. In this case, the thermally transferable protective layer 2 has a two-layer structure comprising a main protective layer 5 and an adhesive layer 6. In order that the thermally transferable protective layer 2 separated by thermal transfer can be strongly adhered to an image-receiving sheet as an object, the main protective layer 5 is transferred through the adhesive layer 6 onto the image-receiving sheet.

Figure 3:
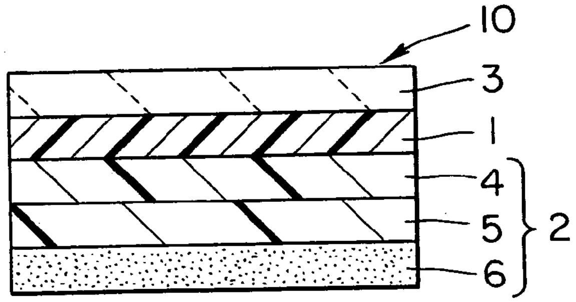
FIG. 3 is a cross-sectional view showing a further embodiment of the protective layer transfer sheet according to the present invention.
Figure 4:
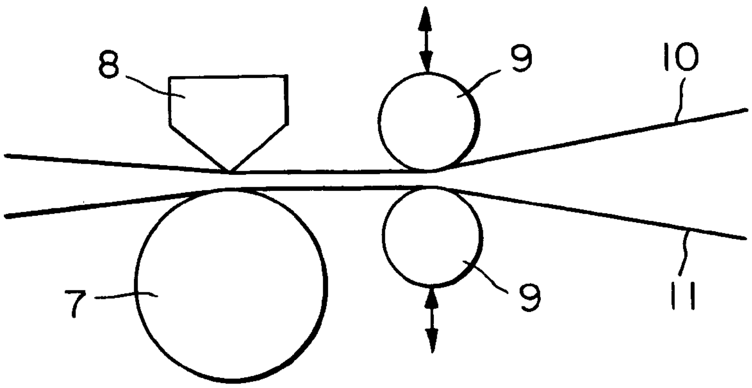
FIG. 4 is a schematic diagram illustrating a carrying jam in a printer.

FIG. 3 is a cross-sectional view showing a further embodiment of the protective layer transfer sheet 10 according to the present invention. In the protective layer transfer sheet 10, a heat-resistant slip layer 3 is provided on one side of the substrate sheet 1, and a release layer 4, a main protective layer 5 and an adhesive layer 6 are provided in that order on the other side of the substrate sheet 1. In this case, the thermally transferable protective layer 2 has a three-layer structure comprising a release layer 4, a main protective layer 5, and an adhesive layer 6. The provision of the main protective layer 5 on the substrate sheet 1 through the release layer 4 permits the main protective layer 5 to be easily separated from the substrate sheet 1 through the release layer 4. The release layer 4 is non-transferable, and, upon thermal transfer, remains on the substrate sheet 1. Further, in order that the thermally transferable protective layer 2 can be strongly adhered to an image-receiving sheet as an object, the main protective layer 5 is transferred through the adhesive layer 6 onto the image-receiving sheet.

Next, layers constituting the protective layer transfer sheet according to the present invention will be described.

Substrate Sheet

In the protective layer transfer sheet of the present invention, any substrate sheet used in conventional thermal transfer sheets as such may be used as the substrate sheet 1. Other substrates may also be used without particular limitation. Specific examples of preferred substrate sheets include tissue papers, such as glassine paper, capacitor paper, and paraffin paper; plastics, such as polyesters, polypropylene, cellophane, polycarbonate, cellulose acetate, polyethylene, polyvinyl chloride, polystyrene, nylon, polyimide, polyvinylidene chloride, and ionomers; and composite substrate sheets comprising combinations of the tissue papers and the plastics. The thickness of the substrate sheet may be properly varied depending upon materials for the substrate sheet so that the substrate sheet has proper strength, heat resistance and other properties. However, the thickness is preferably 3 to 100 μm.

Thermally Transferable Protective Layer

In the protective layer transfer sheet according to the present invention, regarding the thermally transferable protective layer 2 releasably provided on the substrate sheet, the main protective layer 5 as one layer in the thermally transferable protective layer 2 having a multi-layer structure, or the thermally transferable protective layer 2 having a single-layer structure may be formed of various resins commonly known as a resin for a protective layer.

Examples of resins for a protective layer include: polyester resins, polycarbonate resins, acrylic resins, ultraviolet absorbing resins, epoxy resins, polystyrene resins, polyurethane resins, and acrylated urethane resins; silicone-modified products of the above resins; mixtures of the above resins; ionizing radiation-curable resins; and ultraviolet absorbing resins. The incorporation of at least one resin selected from the group consisting of polyester resins, polycarbonate resins, acrylic resins, ultraviolet absorbing resins, and epoxy resins, among these resins, is particularly preferred, for example, from the viewpoints of excellent suitability for coating and provision of excellent light fastness.

In particular, the protective layer containing an ionizing radiation-cured resin has excellent plasticizer resistance and scratch resistance. In this case, conventional ionizing radiation-curable resins may be used for forming such protective layers. For example, a radically polymerizable polymer or oligomer may be crosslinked and cured by irradiation with an ionizing radiation, and, if necessary, a photopolymerization initiator may be added, followed by polymerization crosslinking by electron beams or ultraviolet light.

The protective layer containing an ultraviolet absorbing resin can impart a high level of lightfastness to prints.

The ultraviolet absorbing resin may be, for example, a resin produced by bonding, through a reaction, a reactive ultraviolet absorbing agent to a thermoplastic resin or the above ionizing radiation-curable resin. A more specific example thereof is one produced by introducing a reactive group, such as an addition-polymerizable double bond (for example, a vinyl, acryloyl, or methacryloyl group) or an alcoholic hydroxyl, amino, carboxyl, epoxy, or isocyanate group into a conventional nonreactive organic ultraviolet absorbing agent, for example, a salicylate, benzophenone, benzotriazole, substituted acrylonitrile, nickel chelate, or hindered amine nonreactive ultraviolet absorbing agent.

In the protective layer transfer sheet according to the present invention, the incorporation of microsilica in the thermally transferable protective layer is preferred. The microsilica has been produced by a conventional method and preferably has a particle diameter of 1 to 10 $\mu$m in terms of the average particle diameter of secondary particles as measured by a Coulter counter method. The average particle diameter of secondary particles as measured by the Coulter counter method is the volume average particle diameter, and the particle diameter of microsilica according to the present invention is one as measured by the Coulter counter method, unless otherwise specified.

When the average particle diameter of secondary particles of microsilica is less than 1 $\mu$m, the protective layer transfer sheet is less likely to slip on the image-receiving sheet. In this case, meandering or cockling is likely to occur at the time of the transfer of the protective layer. When the average particle diameter exceeds 10 $\mu$m, the transparency of the protective layer is deteriorated to unfavorably render the underlying thermally transferred image opaque.

The content of microsilica is about 0.05 to 10%, more preferably 3 to 5%, based on the resin solid matter in the protective layer containing the microsilica. When the content of microsilica is less than 0.05%, satisfactory slip properties cannot be provided. On the other hand, when the content of microsilica exceeds 10%, the transparency of the protective layer is deteriorated, and this disadvantageously renders the underlying thermally transferred image opaque.

The incorporation of microsilica into the protective layer in the manner as described above can satisfy a requirement such that the coefficient of friction between the surface of the protective layer and the surface of the image-receiving sheet before thermal transfer is 0. 05 to 0.5 in terms of $\mu_0$ (coefficient of static friction) and $\mu$ (coefficient of dynamic friction) with the value of $\mu_0/\mu$ being 1.0 to 1.5.

In the present invention, all the coefficients of friction were measured according to JIS P 8147.

Production processes of microsilica are divided into dry process and wet process, and any of these processes may be used. In the case of dry process, however, silicon tetrachloride is produced in a gaseous phase by burning and hydrolysis. Therefore, the resultant microsilica is free from gap within the particles, that is, has no internal surface area. This type of silica has low water absorption and low hydrophilicity, and thus is not suitable, for example, for imparting good suitability for writing with a water-base pen or the like to the surface of the protective layer.

When the microsilica is produced by the wet process, a silica sol produced by reacting an aqueous sodium silicate solution with sulfuric acid or hydrochloric acid is allowed to gel. In this case, a porous silica is obtained. Such silica is porous, and, at the same time, has hydrophilic functional groups (silanol groups) on its surface. Therefore, this silica has a high level of hydrophilicity and a high level of water absorption, and hence is preferred, for example, from the viewpoint of imparting suitability for writing. In the case of silica produced by the wet process, when the hydrophilic nature is unfavorable according to applications, the silica may be surface treated with an organic or inorganic compound to lower the level of hydrophilicity.

The thickness of the thermally transferable protective layer having a single-layer structure or the main protective layer provided in the thermally transferable protective layer having a multi-layer structure is generally about 0.5 to 10 $\mu$m, although the thickness varies depending upon the type of the resin for the protective layer.

Heat-resistant Slip Layer

In the protective layer transfer sheet according to the present invention, a heat-resistant slip layer 3 is provided on the backside of the substrate sheet, that is, on the substrate in its side remote from the thermally transferable protective layer, from the viewpoint of avoiding adverse effects, such as sticking or cockling caused by heat from the thermal head.

Any conventional resin may be used as the resin for the formation of the heat-resistant slip layer, and examples thereof include polyvinylbutyral resins, polyvinylacetoacetal resins, polyester resins, vinyl chloride-vinyl acetate copolymers, polyether resins, polybutadiene resins, styrene-butadiene copolymers, acrylic polyols, polyurethane acrylates, polyester acrylates, polyether acrylates, epoxy acrylates, urethane or epoxy prepolymers, nitrocellulose resins, cellulose nitrate resins, cellulose acetopropionate resins, cellulose acetate butyrate resins, cellulose acetate hydrogenphthalate resins, cellulose acetate resins, aromatic polyamide resins, polyimide resins, polycarbonate resins, and chlorinated polyolefin resins.

Slip property-imparting agents added to or coated on the heat-resistant slip layer formed of the above resin include phosphoric esters, silicone oils, graphite powders, silicone graft polymers, fluoro graft polymes, acrylic silicone graft polymers, acrylsiloxanes, arylsiloxanes, and other silicone polymers. Preferably, the heat-resistant slip layer is formed of a polyol, for example, a polyalcohol polymer compound, a polyisocyanate compound, or a phosphoric ester compound. Further, the addition of a filler is more preferred.

The heat-resistant slip layer may be formed by dissolving or dispersing the above resin, slip property-imparting agent, and filler in a suitable solvent to prepare an ink for a heat-resistant slip layer, coating the ink on the backside of the substrate sheet, for example, by gravure printing, screen printing, or reverse coating using a gravure plate, and drying the coating.

Release Layer

When the protective layer is less likely to separate from the substrate sheet, a release layer 4 may be formed between the substrate sheet and the protective layer. The release layer may be formed of, for example, various waxes, such as silicone wax, or a resin, such as a silicone resin, a fluororesin, an acrylic resin, a polyurethane resin, a polyvinylpyrrolidone resin, a polyvinyl alcohol resin, or a polyvinyl acetal resin.

Among these resins, a resin produced by polymerization of a monomer, such as acrylic acid or methacrylic acid, or by copolymerization of a monomer, such as acrylic acid or methacrylic acid, with other monomer or the like is preferred as the acrylic resin which is excellent in adhesion to the substrate sheet, as well as in releasability from the protective layer.

The release layer may be properly selected from a type which is transferred onto an object upon thermal transfer, a type which is left on the substrate sheet side upon thermal transfer, and a type which is subjected to cohesive failure or the like. From the viewpoints of excellent surface gloss, transfer stability of the protective layer and the like, the type is preferably such that the release layer is non-transferable and, upon thermal transfer, remains on the substrate sheet side so that the interface between the release layer and the protective layer serves as the surface of the protective layer after the thermal transfer.

The release layer may be formed in the same manner as described above in connection with the formation of the protective layer mentioned in the thermally transferable protective layer. A release layer thickness of about 0.5 to 5 μm suffices for the contemplated results. When a protective layer, which becomes matte upon transfer, is desired, the incorporation of various particles in the release layer or matting treatment of the surface of the release layer on the main protective layer side can provide a protective layer having a matte surface.

It should be noted that, when the releasability of the protective layer from the substrate sheet is good, there is no need to provide the release layer. In this case, upon thermal transfer, the protective layer can be released directly from the substrate sheet.

Adhesive Layer

According to the present invention, an adhesive layer 6 is preferably provided on the outermost surface of the transferable protective layer in the protective layer transfer sheet, that is, on the main protective layer, from the viewpoint of improving the adhesion of the protective layer to the image-receiving sheet. The adhesive layer may be formed of any conventional pressure-sensitive adhesive or heat-sensitive adhesive, more preferably a thermoplastic resin having a glass transition temperature of 50 to 80° C. For example, it is preferred to select a resin having a suitable glass transition temperature from resins having good adhesion in a hot state, for example, from polyester resins, polycarbonate resins, butyral resins, acrylic resins, ultraviolet absorbing resins, epoxy resins, vinyl chloride-vinyl acetate copolymer resins, polyamide resins, and vinyl chloride resins. In particular, for the adhesive layer, the incorporation of at least one resin selected from polyester resins, polycarbonate resins, butyral resins, acrylic resins, ultraviolet absorbing resins, and epoxy resins is preferred, because this adhesive layer, when the microsilica is added, has excellent dispersibility, adhesion to the image-receiving sheet and other properties.

The ultraviolet absorbing resin, as with the ultraviolet absorbing resin described above in connection with the thermally transferable protective layer, may be one produced by reacting a reactive ultraviolet absorbing agent with a thermoplastic resin or an ionizing radiation-curable resin to bond the reactive ultraviolet absorbing agent to the ionizing radiation-curable resin.

The adhesive layer preferably contains microsilica. The content of the microsilica is preferably 0.05 to 10%, more preferably 3 to 5%, based on the resin solid matter in the adhesive layer. The particle diameter of microsilica contained in the adhesive layer is preferably 1 to 10 μm in terms of the average diameter of secondary particles as measured by a Coulter counter method. The content, average particle diameter, production process of the microsilica and the like are the same as those described above in connection with the transferable protective layer, and, thus, the description thereof will be omitted.

In the protective layer transfer sheet according to the present invention, when the adhesive layer is provided, since the adhesive layer is located on the outermost surface in the form of the protective layer transfer sheet, the incorporation of microsilica in the adhesive layer can bring the coefficient of friction between the surface of the adhesive layer and the surface of the image-receiving sheet to 0.05 to 0.5 in terms of $\mu_0$ (coefficient of static friction) and $\mu$ (coefficient of dynamic friction) with the value of $\mu_0/\mu$ being 1.0 to 1.5.

The adhesive layer is formed by coating a coating liquid containing a resin for constituting the adhesive layer, microsilica, and optionally other additives and drying the coating to form an adhesive layer preferably having a thickness of about 0.5 to 10 μm.

For the protective layer transfer sheet, the transferable protective layer may be solely provided on the substrate sheet. Alternatively, the transferable protective layer, together with dye layers of Y (yellow), M (magenta), and C (cyan) colors or a hot-melt ink layer, may be provided in a face serial manner.

The image-receiving sheet as an object on which an image is formed and, in addition, a protective layer is transferred from the protective layer transfer sheet, is not particularly limited. For example, the substrate may be any sheet of plain papers, wood-free papers, tracing papers, plastic films and the like. The substrate may be in any form of cards, postcards, passports, letter papers, report pads, notes, catalogues and the like. The substrate may have on its surface a receptive layer receptive to a dye. It should be noted that, when the substrate per se is receptive to a dye, there is no need to provide any receptive layer.

The protective layer may be transferred by using any heating-pressing means, which can heat the protective layer or the release layer or the adhesive layer to a temperature at which this layer can be activated, for example, a conventional printer provided with a thermal head for thermal transfer, a hot stamper for foil transfer, or a hot roll. An image may be formed by any conventional means. For example, a contemplated purpose can be satisfactorily attained by applying a thermal energy of about 5 to 100 mJ/dot (in the case of 300 dpi) by means of a recording apparatus, such as a thermal printer (for example, a printer P-330, manufactured by Olympus Optical Co., Ltd.), through the control of the recording time.

Further, the protective layer transfer sheet according to the present invention may be used to prepare ID cards, identification cards, license cards and other cards. These cards contain information on letters in addition to information on images such as photographs. In this case, for example, a method may be used wherein information on letters is formed by a melt transfer method while a photograph-like image or other image may be formed by a sublimation transfer method (a dye transfer method).

Embosses, signatures, IC memories, magnetic layers, holograms, and other prints may also be provided on the cards. In this case, these embosses, signatures, magnetic layers and the like may be provided after the transfer of the protective layer.

EXAMPLES

The present invention will be described in more detail with reference to the following examples and comparative examples. In the following examples and comparative examples, "parts" or "%" is by mass unless otherwise specified.

Example 1

The following coating liquid for a release layer was coated by gravure printing on the surface of a polyethylene terephthalate film (PET, thickness 6.0 $\mu$m, manufactured by Toray Industries, Inc.) having a heat-resistant slip layer on its backside at a coverage on a dry basis of 1.0 g/m$^2$. The coating was pre-dried by a drier, and then dried in an oven kept at 100° C. for 30 min to form are lease layer. The following coating liquid for a protective layer was then coated by gravure printing on the surface of the release layer at a coverage on a dry basis of 3.0 g/m$^2$. The coating was pre-dried by a drier, and then dried in an oven kept at 100° C. for 30 min to form a protective layer. Further, the following coating liquid for an adhesive layer was coated by gravure printing on the surface of the protective layer at a coverage on a dry basis of 3.0 g/m$^2$, and the coating was dried in the same manner as described just above to form an adhesive layer. Thus, a protective layer transfer sheet of Example 1 of the present invention was prepared.

| | |
|---|---|
| Coating liquid for release layer | |
| Acryl-styrene resin (CELTOP 226, manufactured by Daicel Chemical Industries, Ltd.) | 16 parts |
| Aluminum catalyst (CELTOP CAT-A, manufactured by Daicel Chemical Industries, Ltd.) | 3 parts |
| Methyl ethyl ketone | 8 parts |
| Toluene | 8 parts |
| Coating liquid for protective layer | |
| Acrylic resin (Dianal BR-83, manufactured by Mitsubishi Rayon Co., Ltd.) | 50 parts |
| Methyl ethyl ketone | 25 parts |
| Toluene | 25 parts |
| Coating liquid for adhesive layer | |
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Silica (silicon dioxide) (Sylysia 310, average particle diameter 1.4 $\mu$m, manufactured by Fuji Sylysia Chemical Ltd.) | 1 part |

-continued

| | |
|---|---|
| Methyl ethyl ketone | 8 parts |
| Toluene | 8 parts |

Example 2

A release layer, a protective layer, and an adhesive layer were coated in that order on a polyethylene terephthalate film with a heat-resistant slip layer coated thereon in the same manner as in Example 1, except that, in the formation of the adhesive layer, the following coating liquid containing a larger amount of silica than that in Example 1 was used. Thus, a protective layer transfer sheet of Example 2 was prepared.

| | |
|---|---|
| Coating liquid for adhesive layer | |
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Silica (silicon dioxide) (Sylysia 310, average particle diameter 1.4 $\mu$m, manufactured by Fuji Sylysia Chemical Ltd.) | 3 parts |
| Methyl ethyl ketone | 8 parts |
| Toluene | 8 parts |

Example 3

A release layer, a protective layer, and an adhesive layer were coated in that order on a polyethylene terephthalate film with a heat-resistant slip layer coated thereon in the same manner as in Example 1, except that, in the formation of the adhesive layer, the following coating liquid for an adhesive layer, wherein the particle diameter of silica was changed from that in Example 1, was used. Thus, a protective layer transfer sheet of Example 3 was prepared.

| | |
|---|---|
| Coating liquid for adhesive layer | |
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Silica (silicon dioxide) (Sylysia 530, average particle diameter 1.9 $\mu$m, manufactured by | 1 part |

-continued

| | |
|---|---|
| Fuji Sylysia Chemical Ltd.) | |
| Methyl ethyl ketone | 8 parts |
| Toluene | 8 parts |

Example 4

A release layer, a protective layer, and an adhesive layer were coated in that order on a polyethylene terephthalate film with a heat-resistant slip layer coated thereon in the same manner as in Example 1, except that, in the formation of the adhesive layer, the following coating liquid for an adhesive layer was used instead of that in Example 1. Thus, a protective layer transfer sheet of Example 4 was prepared.

| Coating liquid for adhesive layer | |
|---|---|
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Anhydrous silica (Aerosil R972, average particle diameter 0.012 μm, manufactured by Nippon Aerosil Co., Ltd.) | 1 part |
| Methyl ethyl ketone | 8 parts |
| Toluene | 8 parts |

Comparative Example 1

A release layer, a protective layer, and an adhesive layer were coated in that order on a PET film with a heat-resistant slip layer coated thereon in the same manner as in Example 1, except that, in the formation of the adhesive layer, the following silica-free coating liquid for an adhesive layer was used instead of the coating liquid for an adhesive layer in Example 1. Thus, a protective layer transfer sheet of Comparative Example 1 was prepared.

| Coating liquid for adhesive layer | |
|---|---|
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Methyl ethyl ketone | 8 parts |
| Toluene | 8 parts |

Comparative Example 2

A release layer, a protective layer, and an adhesive layer were coated in that order on a PET film with a heat-resistant slip layer coated thereon in the same manner as in Example 1, except that, in the formation of the adhesive layer, the following coating liquid for an adhesive layer was used instead of that in Example 1. Thus, a protective layer transfer sheet of Comparative Example 2 was prepared.

| Coating liquid for adhesive layer | |
|---|---|
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Silica (silicon dioxide) (Sylysia 310, average particle diameter 1.4 μm, manufactured by Fuji Sylysia Chemical Ltd.) | 0.01 part |
| Methyl ethyl ketone | 8 parts |
| Toluene | 8 parts |

Comparative Example 3

A release layer, a protective layer, and an adhesive layer were coated in that order on a PET film with a heat-resistant slip layer coated thereon in the same manner as in Example 1, except that, in the formation of the adhesive layer, the following coating liquid for an adhesive layer was used instead of that in Example 1. Thus, a protective layer transfer sheet of Comparative Example 3 was prepared.

| Coating liquid for adhesive layer | |
|---|---|
| Polycarbonate resin (FPC-2136, manufactured by Mitsubishi Gas Chemical Co., Inc.) | 7 parts |
| Polyester resin (Vylon 700, manufactured by Toyobo Co., Ltd.) | 11 parts |
| Acrylic copolymer as ultraviolet absorber (UVA 635L, manufactured by BASF Japan) | 4.5 parts |
| Benzotriazole ultraviolet absorber (TINUVIN 900, manufactured by CIBA-GEIGY Ltd.) | 6 parts |
| Benzotriazole ultraviolet absorber (TINUVIN 320, manufactured by CIBA-GEIGY Ltd.) | 3 parts |
| Silica (silicon dioxide) (Sylysia 310, average particle diameter 1.4 μm, manufactured by Fuji Sylysia Chemical Ltd.) | 5 parts |
| Methyl ethyl ketone | 8 parts |
| Toluene | 8 parts |

1. Evaluation of Slip Property

The protective layer transfer sheet prepared in the above examples and comparative examples and P60NOC (an image-receiving paper for a printer P-330, manufactured by Olympus Optical Co., Ltd.) as an image-receiving sheet, on which a protective layer is to be transferred, were provided. The coefficient of friction between the surface of the protective layer transfer sheet (surface of the adhesive layer) and the surface of the image-receiving sheet was measured in terms of the coefficient of static friction $\mu_0$ and the coefficient of dynamic friction $\mu$.

The results of measurements were as summarized in Table 1 below.

TABLE 1

| | Average particle diameter of silica, $\mu$m | Coefficient of static friction, $\mu_0$ | Coefficient of dynamic friction, $\mu$ | $\mu_0/\mu$ |
|---|---|---|---|---|
| Ex. 1 | 1.4 | 0.39 | 0.39 | 1.0 |
| Ex. 2 | 1.4 | 0.39 | 0.39 | 1.0 |
| Ex. 3 | 1.9 | 0.41 | 0.41 | 1.0 |
| Ex. 4 | 0.012 | 0.46 | 0.46 | 1.0 |
| Comp. Ex. 1 | — | 1.87 | 0.7 | 2.67 |
| Comp. Ex. 2 | 1.4 | 0.51 | 0.51 | 1.0 |
| Comp. Ex. 3 | 1.4 | 0.35 | 0.35 | 1.0 |

For the protective layer transfer sheets of the examples of the present invention, the coefficient of friction between the surface of the protective layer and the surface of the image-receiving sheet before thermal transfer was 0.05 to 0.5 in terms of $\mu_0$ (coefficient of static friction) and $\mu$ (coefficient of dynamic friction), and the value of $\mu_0/\mu$ was 1.0. That is, the coefficient of static friction was low and had no difference from the coefficient of dynamic friction, indicating that the protective layer transfer sheets of the examples of the present invention possess excellent slip properties.

By contrast, for the protective layer transfer sheets of Comparative Examples 1 and 2, both the coefficient of static friction and the coefficient of dynamic friction were high, and the value of $\mu_0/\mu$ was as high as 2.67 for the protective layer transfer sheet of Comparative Example 1, although the value of $\mu_0/\mu$ was 1.0 for the protective layer transfer sheet of Comparative Example 2. This indicates that these comparative protective layer transfer sheets possess inferior slip properties.

For the protective layer transfer sheet of Comparative Example 3, the coefficient of static friction was low and had no difference from the coefficient of dynamic friction, indicating that this protective layer transfer sheet has good slip properties. For the protective layer transfer sheet of Comparative Example 3, the transparency of the protective layer described below was poor due to excessive silica content.

2. Evaluation of Actual Prints

A printer P-330 manufactured by Olympus Optical Co., Ltd. was provided as a thermal dye transfer printer (a sublimation transfer printer). The image-receiving sheet as described above and a specialty thermal transfer sheet for the printer were used to perform printing using a full-color test pattern by means of the printer. A protective layer was then transferred from each protective layer transfer sheet onto the surface of the print by means of the printer used just above.

As a result, for the protective layer transfer sheets of Examples 1 to 4, no cockling occurred in the prints at all at the time of the transfer of the protective layer, and, in addition, there was no other trouble.

By contrast, for the protective layer transfer sheet of Comparative Examples 1 and 2, cockling occurred in the prints at the time of the transfer of the protective layer. For the protective layer transfer sheet of Comparative Example 3, no cockling occurred in the prints at the time of the transfer of the protective layer.

3. Evaluation of Transparency of Protective Layer

Printing was carried out using a full-color test pattern in the same manner as described above in connection with the evaluation of the actual print. A protective layer was then transferred from each protective layer transfer sheet onto the surface of the print in the same manner as described above. For each print, the OD value at places of six steps in gradation from the highlight portion to the shadow portion in color mixed portions of yellow (Y), magenta (M), and cyan (C) was measured with RD-918 manufactured by Macbeth. For each measured value, the difference between the corresponding density and the measured value for Comparative Example 1 was determined (a difference between the measured value for each example and the measured value for Comparative Example 1 under the same applied energy condition). That is, in this test, an evaluation was done for a lowering in transparency (lowering in print density (OD)) as compared with the case where silica was not added at all to the protective layer.

The results of measurement were as summarized in Table 2 below.

TABLE 2

| | Color mixture of YMC OD value | | | | | |
|---|---|---|---|---|---|---|
| Ex. 1 | 0.05 | 0.09 | 0.33 | 0.75 | 1.25 | 1.77 |
| | (0) | (0) | (0) | (0) | (+0.01) | (−0.01) |
| Ex. 2 | 0.05 | 0.09 | 0.33 | 0.75 | 1.24 | 1.77 |
| | (0) | (0) | (0) | (0) | (0) | (−0.01) |
| Ex. 3 | 0.05 | 0.09 | 0.33 | 0.75 | 1.25 | 1.77 |
| | (0) | (0) | (0) | (0) | (+0.01) | (−0.01) |
| Ex. 4 | 0.05 | 0.09 | 0.34 | 0.75 | 1.24 | 1.78 |
| | (0) | (0) | (+0.01) | (0) | (0) | (0) |
| Comp. Ex. 1 | 0.05 | 0.09 | 0.33 | 0.75 | 1.24 | 1.78 |
| Comp. Ex. 2 | 0.05 | 0.09 | 0.33 | 0.75 | 1.24 | 1.78 |
| | (0) | (0) | (0) | (0) | (0) | (0) |
| Comp. Ex. 3 | 0.05 | 0.09 | 0.33 | 0.75 | 1.24 | 1.71 |
| | (0) | (0) | (0) | (0) | (0) | (−0.07) |

In the table, numerical values in parentheses represent a difference between the measured value for each example and the measured value for Comparative Example 1 corresponding to the measured value for each example, that is, (each measured value —measured value for Comparative Example 1 corresponding to the measured value for each example).

For Examples 1 to 4, a lowering in density of prints attributable to the transfer of the protective layer did not occur, and the quality of the beautiful image produced by sublimation (dye transfer) could be maintained. By contrast, for Comparative Example 3, a lowering in density of prints attributable to the transfer of the protective layer occurred. Specifically, there was a difference in sharpness of the image printed by sublimation between before the transfer of the protective layer and after the transfer of the protective layer, and a deterioration in quality of the image occurred after the transfer of the protective layer.

As described above, according to the protective layer transfer sheet of the present invention, in a protective layer transfer sheet comprising a substrate sheet, a heat-resistant slip layer provided on one side of the substrate sheet, and a thermally transferable protective layer releasably provided on at least a part of the surface of the substrate sheet remote from the heat-resistant slip layer, bringing the coefficient of friction between the surface of the protective layer and the surface of the image-receiving sheet before thermal transfer to 0.05 to 0.5 in terms of $\mu_0$ (coefficient of static friction) and $\mu$ (coefficient of dynamic friction) with the value of $\mu_0/\mu$ being 1.0 to 1.5, that is, bringing the coefficient of static friction and the coefficient of dynamic friction to the above respective ranges and reducing the difference between the coefficient of static friction and the coefficient of dynamic friction to the above range, can prevent carrying troubles, such as meandering or cockling, within a printer.

What is claimed is:

1. A protective layer transfer sheet comprising:

a substrate sheet;

a heat-resistant slip layer provided on one side of the substrate sheet; and a thermally transferable protective layer releasably provided on at least a part of the surface of the substrate sheet opposite to the heat-resistant slip layer side, the protective layer comprising a main protective layer and an adhesive layer provided in that order from the substrate sheet side, the adhesive layer containing from 3 to 10% of microsilica based on a resin solid matter in the adhesive layer, the coefficient of friction between the surface of the protective layer and the surface of an image-receiving sheet before thermal transfer being 0.05 to 0.5 in terms of $\mu_0$ (coefficient of static friction) and $\mu$ (coefficient of dynamic friction) with the value of $\mu_0/\mu$ being 1.0 to 1.5.

2. The protective layer transfer sheet according to claim 1, wherein the adhesive layer contains from 3 to 5% of microsilica.

3. The protective layer transfer sheet according to claim 1, wherein the particle diameter of the microsilica is 1 to 10 $\mu$m in terms of the average diameter of secondary particles as measured by a Coulter counter method.

4. The protective layer transfer sheet according to claim 1, wherein the thermally transferable protective layer contains at least one resin selected from the group consisting of polyester resins, polycarbonate resins, acrylic resins, ultraviolet-absorbing resins, and epoxy resins, and microsilica.

5. The protective layer transfer sheet according to claim 1, wherein the thermally transferable protective layer comprises a release layer, a main protective layer, and an adhesive layer provided in that order from the substrate sheet side, the release layer contains an acrylic resin, and the adhesive layer contains at least one resin selected from the group consisting of polyester resins, polycarbonate resins, butyral resins, acrylic resins, ultraviolet-absorbing resins, and epoxy resins, and microsilica.

6. The protective layer transfer sheet according to claim 1, further comprising a non-transferable release layer, and, upon thermal transfer, the release layer stays on the substrate sheet while the protective layer is separable from the substrate sheet.

7. The protective layer transfer sheet according to claim 1, wherein, upon thermal transfer, the thermally transferable protective layer is separable directly from the substrate sheet.

* * * * *